US008874091B2

(12) United States Patent
Norrman

(10) Patent No.: US 8,874,091 B2
(45) Date of Patent: Oct. 28, 2014

(54) AUTOMATIC DEVICE CAPABILITIES CHANGE NOTIFICATION

(75) Inventor: Karl Norrman, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 1470 days.

(21) Appl. No.: 11/997,658

(22) PCT Filed: Jul. 11, 2006

(86) PCT No.: PCT/EP2006/006776
§ 371 (c)(1),
(2), (4) Date: Feb. 1, 2008

(87) PCT Pub. No.: WO2007/014630
PCT Pub. Date: Feb. 8, 2007

(65) Prior Publication Data
US 2008/0220759 A1    Sep. 11, 2008

(30) Foreign Application Priority Data
Aug. 3, 2005 (EP) ..................................... 05016857

(51) Int. Cl.
*H04L 29/08* (2006.01)
*H04W 8/22* (2009.01)
*H04M 3/42* (2006.01)
*H04W 8/18* (2009.01)

(52) U.S. Cl.
CPC .................. *H04W 8/22* (2013.01); *H04L 67/04* (2013.01); *H04L 67/303* (2013.01); *H04M 3/42136* (2013.01); *H04M 3/42178* (2013.01); *H04W 8/18* (2013.01)
USPC .......................................................... 455/418

(58) Field of Classification Search
USPC .......................................................... 455/418
See application file for complete search history.

(56) References Cited

U.S. PATENT DOCUMENTS 7,983,226 B2    7/2011    Oommen et al.
2005/0010585 A1    1/2005    Sahinoja et al.

FOREIGN PATENT DOCUMENTS

| EP | 0 685 972 A2 | 12/1995 |
| EP | 1376989 A | 1/2004 |
| EP | 1376990 A | 1/2004 |
| EP | 1376990 A2 * | 1/2004 |
| WO | WO 00/67501 A1 | 11/2000 |
| WO | WO02091702 | 11/2002 |
| WO | WO 03/049381 A1 | 6/2003 |

OTHER PUBLICATIONS

Device Management Working Group "OMA Device Management Tree and Description" OMA-TS-DM-TND-V1-2-20050615-C p. 1-48.

(Continued)

*Primary Examiner* — Lester Kincaid
*Assistant Examiner* — Diego Herrera

(57) ABSTRACT

An improved approach to mobile device capability management is described herein where a capability management device is provided at a mobile communication network. Upon change of a mobile device capability, a related notification is sent to the capability management device which applies a policy decision whether to track the capability change at the network side or not. Should the decision be 'yes', the capability management device starts a device management session to collect further information on a mobile device capability change beyond the information made available with the mobile device capability change notification. After retrieval of the mobile device capability change information, the capability management device will update its mobile device capability state accordingly.

50 Claims, 8 Drawing Sheets

(56) References Cited

OTHER PUBLICATIONS

Calhoun, et al: "Diameter Base Protocol". Network Working Group RFC: 3588. Sep. 2003.
OMA: "SyncML Device Management Tree and Description, v1.1", Feb. 2002.
Rigney, et al: "Remote Authentication Dial in User Service". Network Working Group RFC: 2138. Apr. 1997.
OMA: "SyncML Sync Protocol, version 1.1". Feb. 2002.
OMA: "SyncML Device Management Standardised Objects". Version 1.1. Feb. 2002.

* cited by examiner

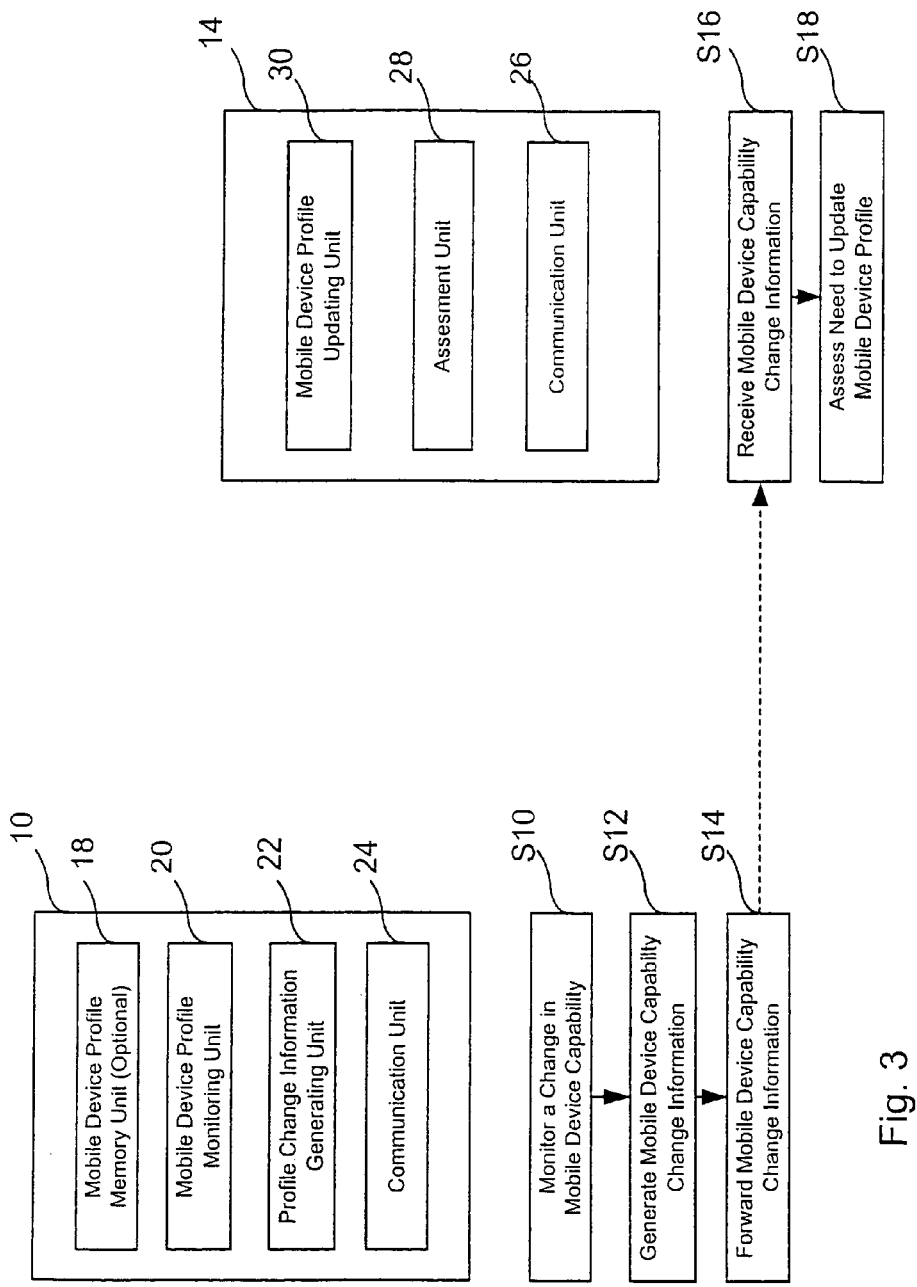

AUTOMATIC DEVICE CAPABILITIES CHANGE NOTIFICATION

This application is a 371 of PCT/EP2006/006776 filed on Jul. 11, 2006, which claims the benefit of EP Patent Application No. 05016857.4 filed on Aug. 3, 2005.

FIELD OF INVENTION

The present invention relates to a method of operating a mobile device capability management apparatus in a mobile communication network and also to a method of operating a mobile device being enabled for mobile device capability management. Further, the present invention relates to a corresponding mobile device capability management apparatus and a mobile device interacting with the mobile device capability management apparatus.

BACKGROUND ART

As mobile devices are becoming more complex, flexible and capable of more functionality, each mobile device evolves into an increasingly unique user specific equipment diverging from previously pre-installed functionalities. In the telecommunication world, this leads to a big change from earlier days, when mobile devices of a certain model were static with respect to both hardware and to a large extent even software.

Today, mobile devices communicate their capabilities to a wireless communication network when attaching thereto by sending its identification ID and the version number reflecting its entire software image. Further, the operator of the wireless communication network has the option, upon reception of the mobile device identification ID, to retrieve a stored version of the software installed in the mobile device into a mobile communication network operator controlled database.

FIG. 1 shows a sample management tree maintained in support of mobile device capability management.

One specification of such a management tree is specified in OMA, SyncML device management tree and description, version 1.1, February 2002.

As shown in FIG. 1, the management tree serves to specify the structure of the configuration capability present in a mobile device. The main idea is to use the management tree, which resembles, e.g., a UNIX file system. The management tree contains sub-trees called management objects MO. These management objects are composed of information required to form a specific task, e.g., they may be related to device specific information, MMS functionality or email functionality. A device information management object contains a leaf node named './DevInfo/Lang', holding information on the currently selected operative language for the mobile device.

As shown in FIG. 1, leaf nodes may be identified using a relative unified resource identifier URI, so that it is possible to read and write content of leaf nodes using standards like Synchronization Meta language SyncML. Also, such synchronization meta languages may be used to add and remove nodes in the management tree.

Further, while it is possible for the operator to update the information in the leaves of the management tree while the mobile device is attached to the mobile communication network, there exists also the possibility to change settings and to upgrade the functionality of the mobile device from other resources than the operator of the mobile communication network. Also, this may be achieved when the mobile device is not attached to the mobile communication network. Should such a situation occur, the operator would be interested in knowing what has changed in the mobile device in order to provide such information to, e.g., service applications interacting with the mobile device or third party service providers that deliver device and their content and services to the mobile device.

Here, when a new service is made available in a mobile device, this will typically lead to a new management object being installed in the management tree. In many cases, e.g., for reasons of consistency, it would be interesting for the operator of the mobile communication network to retrieve also these extensions to the management tree. It should be noted that it is not always possible for the operator to know such information in advance.

An additional problem with existing solutions is that information conveyed by the mobile device on its capabilities is usually too coarse. As outlined above, existing solutions only provide a software version number for the entire software image present in the mobile device. Typically, such information could be sent from the access network, MSC/HLR, to a service layer device management device using automatic device detection procedures, as an example.

SUMMARY OF INVENTION

In view of the above, the object of the present invention is to provide an improved management of mobile device capabilities.

According to the present invention, this object is achieved by a method of operating a mobile device capability management device in a mobile communication network with respect to at least one mobile device served by the mobile communication network. According to the present invention, a mobile device capability is represented two-fold, i.e. as a first mobile device profile in the mobile device capability management device operated by a network operator and as a second mobile device profile maintained in the mobile device. Upon change of mobile device capability and functionality, at the mobile device capability management device, there is received a mobile device capability change information with respect to the mobile device capability change.

According to the present invention, it is suggested that the mobile device capability management device executes a step to assess the need to update the first mobile device profile in the mobile device capability management device. This assessment is achieved on the basis of a mobile device capability management policy and the received mobile device capability change information.

Therefore, the present invention provides the possibility for a mobile device capability management system run by an operator of a mobile communication network to get up-to-date information on the mobile device capability change and therefore a detailed view on the mobile device capabilities in cases where the mobile device was updated via some facilities being different from the mobile device capability management device. Contrary to existent solutions, where only the version number of the software image is conveyed to an operator of a mobile wireless network, the present invention allows for a much finer granularity of information sent from the mobile device to a mobile device capability management device.

Further, the invention enables efficient timely automatic detection of mobile device capability changes like firmware changes or device software changes, and to retrieve information on such changes, even with respect to specific components and functionalities, e.g., an updated audio or video codec, newly installed/updated applications, and/or change of user preferences, e.g., preferred language.

According to a preferred embodiment of the present invention, there is provided the step of actually updating the mobile device profile in the mobile device capability when the assessment step indicates necessity of such an update.

Yet another important advantage of the present invention is that it is possible to execute the assessment step in a very flexible way. In other words, according to a specified mobile device capability management policy, one could, e.g., decide to track every mobile device capability change in the mobile device capability management device, or to only track such changes according to specific time windows, or with respect to certain functionalities, or according to subscriber information, whatsoever. The option to specify a mobile device capability management policy is highly advantageous to avoid unnecessary steps at the mobile device capability management device, should only minor changes occur with respect to the capability of the mobile device. The avoidance of such unnecessary update steps at the mobile device capability management device is also a prerequisite to avoid unnecessary traffic in the mobile communication network run by the operator, which also runs the mobile device capability management device.

In more detail, according to a preferred embodiment, only upon assessment of a necessary update, there is established a mobile device management session between the mobile device capability management device and the mobile device for evaluation of the second mobile device profile in the mobile device. Then, related mobile device capability update information for processing in the mobile device capability management device is received. Preferably, such information may be provided as a mobile device management object being specified for a mobile device management tree structure which may be dedicated to the mobile device capability change management.

An important advantage of this procedure is that, as outlined above, overall mobile device management traffic can be minimized according to the established mobile device capability management policy, and that further mobile device capability change information is transferred in a way suitable for a mobile device management tree data structure used in the mobile device capability management device.

According to a preferred embodiment of the present invention, the mobile device capability change information contains a qualitative parameter indicating seriousness of change to the mobile device profile and a quantitative parameter indicating amount of detective changes to the mobile device profile.

Typically, seriousness of change reflects a degree of change or, in other words, minor, medium, major, as an example. This information is helpful to assess at the mobile device capability management device whether to actually establish a mobile device management session or not. Further, the amount of detective changes reflects the actual changes added to the mobile device profile and therefore gives information on what type of functionality has actually been changed at the mobile device side.

This two-step approach to forwarding of mobile device capability change information is very effective in that in a first step only a degree of change is indicated to the mobile device management device and then, in a second step, detailed information necessary for mobile device capability profile update at the mobile device capability management device is exchanged, e.g., by establishment of a mobile device capability management session.

According to a preferred embodiment of the present invention, the mobile device capability management device further notifies a service provider delivering services to the mobile device and/or an application interacting with the mobile device on a mobile device capability change.

An important advantage of this notification is that not only at the operator side running the mobile communication environment information reflecting a mobile device profile update is available, but also at third parties. This spread out of mobile device capability change information to all parties interacting with the mobile device achieves consistency throughout the complete operative environment and therefore an increase in quality of service delivery.

Further to the above, the object outlined above is also achieved according to a second aspect of the present invention by a method of operating a mobile device being enabled for mobile device capability management through a mobile communication network. Here, in the mobile device a mobile device capability state is represented as a mobile device profile.

According to the present invention, the method of operating a mobile device comprises the step of monitoring a change in the mobile device capability. Then, should a change in the mobile capability be monitored, there is generated a mobile device capability change information with respect to a mobile device capability change. Then, the mobile device executes a step to forward the generated mobile device capability change information to the mobile communication network. Therefore, an important advantage of the mobile device according to the present invention is that it is not only adapted to receive instructions for mobile device capability management, but that it also provides functionality in itself to continuously monitor the mobile device capability. This monitoring is a prerequisite for initiation of a capability change notification to the mobile communication network for improved mobile device capability management therein. Therefore, the operator may effectively and in real-time execute a mobile device capability update in support of backup services for end users and/or in support of mobile device capability sharing towards external mobile device relevant applications.

According to a preferred embodiment, the mobile device capability change information comprises a qualitative parameter indicating seriousness of change to the mobile device profile and a quantitative parameter indicating amount of effective changes to the mobile device profile. Similar to the advantages given above, the mobile device is adapted to support a two-stage approach to capability change information delivery so as to reduce traffic for mobile device capability management.

Also, it should be mentioned that according to the present invention, mobile device capability change information may be exchanged with the mobile communication network either through a circuit switched mobile communication, a packet switched mobile communication and/or through service layer data exchange or any hybrid form thereof.

Again, the applicability of different types of mobile communication support flexibility and availability of information exchange during mobile device capability management.

According to another preferred embodiment of the present invention there is provided a computer program product directly loadable into the internal memory of a mobile device capability management device in a mobile communication network comprising software code portions for performing the inventive mobile device capability management process when the product is run on a processor of the mobile device capability management device.

According to another preferred embodiment of the present invention there is provided a computer program product directly loadable into the internal memory of a mobile device being enabled for mobile device capability management through a mobile communication network comprising software code portions for performing the inventive mobile device capability update process when the product is run on a processor of the mobile device.

Therefore, the present invention is also provided to achieve an implementation of the inventive method steps on computer or processor systems. In conclusion, such implementation leads to the provision of computer program products for use with a computer system or more specifically a processor comprised in, e.g., a mobile device capability management device or a mobile device.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or Internet and/or telephone networks via modems or other interface devices. It should be understood that such media, when carrying processor readable instructions implementing the inventive concept represent alternate embodiments of the present invention.

BRIEF DESCRIPTION OF DRAWING

In the following the best mode of carrying out the present invention and corresponding preferred embodiments will be described with reference to the drawing in which:

FIG. 3 shows a schematic diagram of a mobile device according to the present invention and a related flowchart of operation;

FIG. 4 shows a schematic diagram of a mobile device capability management device according to the present invention and a related flowchart of operation;

DESCRIPTION OF BEST MODE AND PREFERRED EMBODIMENTS

In the following, the present invention will be described with respect to what is considered as best mode and preferred embodiments thereof. While in the following different principles underlying the present invention will be explained with respect to a mobile device capability management tree, nevertheless, it should be noted that the application of such a mobile device capability management tree is not to be considered as restricting the scope of the present invention, as long as any type of information reflecting the capability of the mobile device is maintained. Thus, it should be understood that any other type of data structure suitable for maintaining a mobile device capability profile is well covered by the present invention.

Further, insofar as different functionality of the present invention is explained, it should be clear that any such functionality may be implemented in hardware or software and/or a combination thereof.

Figure 2:
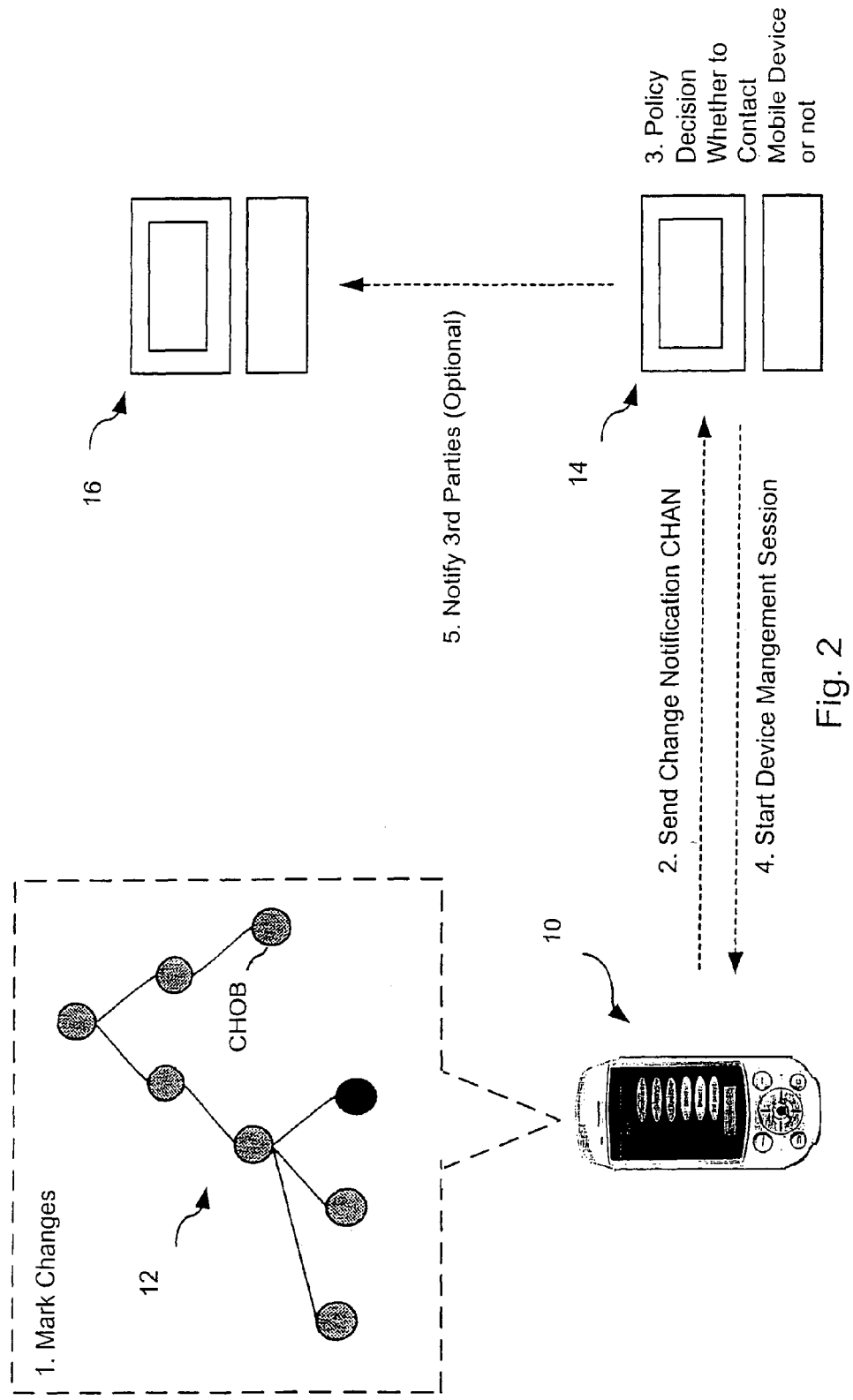
FIG. 2 shows a basic concept underlying the present invention.

FIG. 2 shows a basic concept underlying the present invention.

As shown in FIG. 2, in a mobile device 10, there is maintained some type of information reflecting the mobile device capability which is shown in the form of a mobile device capability management tree 12 in FIG. 2. This structure forms the pre-requisite for implementing the present invention at the mobile device side, i.e. the execution of a marking phase. Here, during changes to the mobile device capability, the mobile device monitors such changes, collects information on changes and sets up mobile capability change information that may be conveyed to the mobile device capability management device, e.g., a device management server.

As shown in FIG. 2, a second element of the inventive mobile device management is a so-called notification phase, wherein the mobile device notifies the mobile device capability management device 14 on the device capability change(s). Preferably, this notification may include the type of change and, optionally, a descriptor of the involved mobile device capability changes.

As shown in FIG. 2, a third element of the inventive mobile device management process is a so-called reaction phase, where the mobile device capability management device 14 receives the notification of a mobile device capability change and reacts accordingly. Such reaction is based on the received mobile device capability change information and a mobile device capability management policy. Here, it should be noted that such a policy reflects how accurate the changes of mobile device capability must be tracked at the mobile device capability management device, on what mobile device capability management traffic on the network would be acceptable, type of change and related handling of the mobile device capability management device 14, etc. Also, it should be noted that according to the present invention, such a mobile device capability management policy may either be static and predetermined or dynamically changed over time.

As shown in FIG. 2, a positive assessment on necessity of a mobile device capability profile update at the mobile device capability management device 14, the mobile device capability management device 14 will react through establishing a device management session with the mobile device 10 for subsequent receipt of information being related to the mobile device capability change in any appropriate form. Optionally, the mobile device capability management device 14 may notify third parties of the mobile device capability change, once the related information is received from the mobile device 10.

Therefore, the basic concept underlying the present invention allows for a finer granularity of information being related to a mobile device capability change which is sent from the mobile device 10 to the mobile device capability management device 14. Contrary to existing solutions, only a version number of a software image is conveyed to the operator of the mobile communication network. The present invention enables automatic detection of mobile device capability changes and subsequent retrieval of information on changes made to specific components, e.g., an updated codec, an installed application, and/or change of the user preference such as a preferred language. Therefore, the operator of the mobile communication network can use this detailed knowledge on the mobile device capability for device services for end users and/or for mobile device capability sharing towards third parties 16 and further applications.

In the following, further details of the present invention will be explained with respect to FIGS. 3 to 10. Here, FIG. 3 shows a schematic diagram of a mobile device according to the present invention and a related flowchart of operation.

As shown in FIG. 3, the mobile device 10 comprises a mobile device memory unit 18, a mobile device profile monitoring unit 20, a profile changing information generating unit 22, and a communication unit 24.

Operatively, the mobile device profile monitoring unit 20 executes a step S10 to monitor a change in the mobile device capability. Further, operatively the mobile change information generating unit 22 executes a step S12 to generate mobile device capability change information with respect to a mobile device capability change. Then, the communication unit 24 executes a step S14 to forward the mobile device capability change information to the mobile communication network. Any type of information reflecting the mobile device capability is stored in the mobile device profile memory unit 18.

FIG. 4 shows a schematic diagram of a mobile device capability management device 14 according to the present invention and a related flowchart of operation.

As shown in FIG. 4, the mobile device capability management device 14 comprises a communication unit 26, an assessment unit 28, and a mobile device profile updating unit 30.

Figure 1:
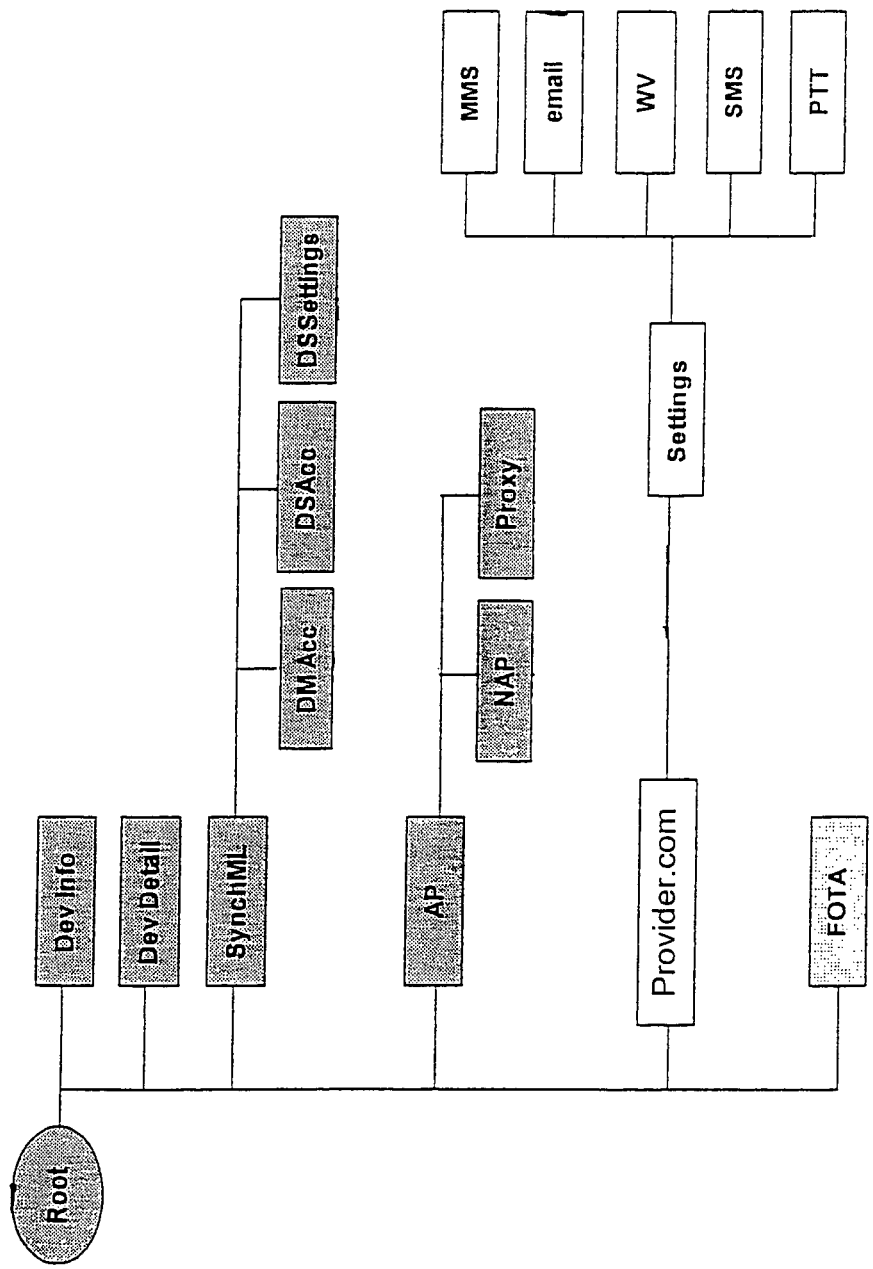
FIG. 1 shows a sample management tree maintained in support of mobile device capability management.

As shown in FIG. 4, operatively, the communication unit 26 executes a step S16 to receive a mobile device capability change information with respect to a mobile device capability change from a mobile device 10 being enabled for mobile device capability management. Then, operatively the assessment unit 28 will execute a step S18 to assess the need to update the mobile device profile in the mobile device capability management device. This assessment is based on a mobile device capability management policy and the received mobile device capability change information. The mobile device capability management policy, either static or changed dynamically over time, may reflect any criteria of value to the operator of the mobile communication environment, e.g., amount of desired mobile device management traffic, degree of changes at the mobile device side, e.g., minor, middle, major, focus on specific types of functionality updates at the mobile device side of particular relevance to the operator, e.g., update of speech coding software or lower layer communication software, etc. As shown in FIG. 1, should the assessment step S18 lead to a result that no update of a mobile device profile is necessary at the time being at the mobile device capability management device 14, then the operation of the mobile device capability management device 14 stops. Otherwise, the mobile device profile updating unit 30 will react to the information received with respect to a mobile device capability change.

Figure 5:
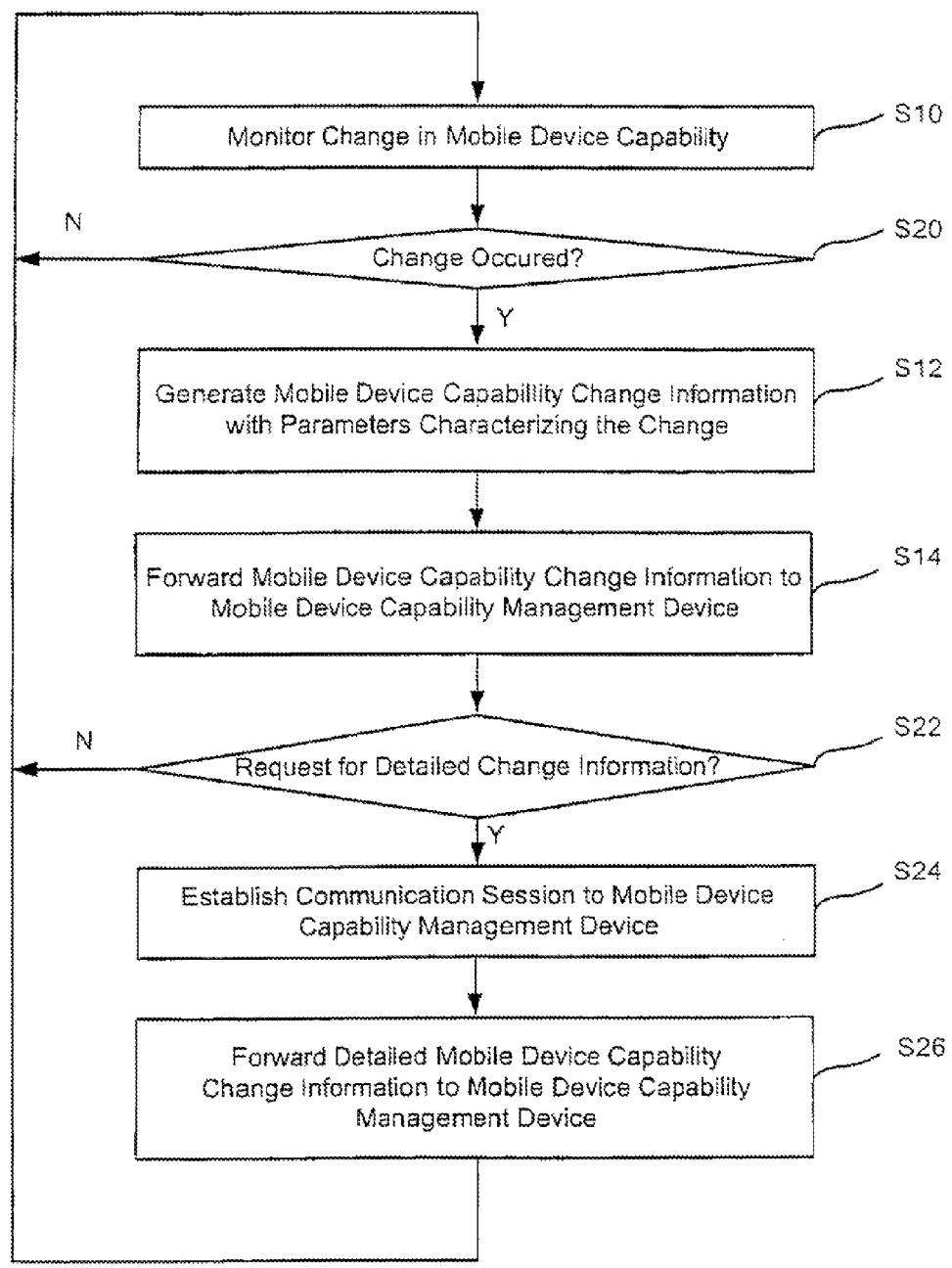
FIG. 5 shows a further detailed flowchart of operation for the mobile device shown in FIG. 3.

FIG. 5 shows a further detailed flowchart of operation of the mobile device 10 being enabled for mobile device capability management shown in FIG. 3.

As shown in FIG. 5, the mobile device profile monitoring unit 20 shown in FIG. 3 continuously executes the step S10 to monitor changes in mobile device capability. It may be implemented as a set of functions that are initiated upon a change of a mobile device profile. After step S10 the mobile device profile monitoring unit 20 executes a step S20 to check whether a change in capability in detail has occurred. If this is not the case, it will branch back to the monitoring step S10 to repeat the monitoring of mobile device capability changes. Otherwise, the profile change information generating unit 22 executes the step S12 to generate the mobile device capability change information as outlined above. Here, without restricting the scope of the present invention, one may assume that the mobile device profile is represented as a mobile device capability management tree. Further, according to the present invention, it is suggested that the management tree contains an object called 'changes object' CHOB. For each capability change in the mobile device 10, therefore the related changes object in the management tree will be modified to reflect the changes to the mobile device capability into the changes object. From the viewpoint of a management tree representation, the changes object may reflect, when another object is changed, added or deleted, or when a change to a leaf node of the management tree has happened, as will be explained in more detail with respect to FIGS. 8 and 9, respectively.

As shown in FIG. 5, after generation of the mobile device capability change information, e.g., related update of the changes object CHOB, then the communication unit 24 will execute the step S14, as soon as the mobile device has network connectivity, to forward mobile device capability change information to the mobile device capability management device 14. This may be achieved by set-up of a modification notification CHAN message. Preferably, the change notification CHAN message consists of two parts:

A qualitative parameter indicating the degree of changes to the management tree. E.g., the qualitative parameter may be qualified into major, medium or minor. Otherwise, one may consider a qualitative parameter being scaled from 0 to 1 to have a finer grid of indicating of the amount of changes.

The second parameter is a quantitative parameter indicating the amount of effective changes to the management tree. Here, one may consider, e.g., a situation where an end user modified, e.g., a speech codec of a mobile device 10. Assuming that the speech codec is indeed activated, the quantitative parameter would indicate one changed node in the management tree. Otherwise, assuming that the speech codecs envisaged by the end user is not compatible with the operative system of the mobile device 10 and would therefore not be activated, the quantitative parameter would indicate an amount of 0 with respect to this change, notwithstanding the further amendments to the management tree, which may be notified at the same time with the change notification CHAN message.

As shown in FIG. 5, further steps of operation of the mobile device 10 may relate to the interaction with the mobile device capability management device 14 shown in FIG. 4.

As shown in FIG. 5, the communication unit 24 of the mobile device 10 may execute a step S22 to receive a request for mobile device capability change information from the mobile communication network, which information would be more detailed over the change notification CHAN message referred to above. Then, the communication unit 24 executes a step S24 to establish a mobile device capability management communication session with the mobile device capability management device 14.

Then, the communication unit 24 will execute a step S26 to forward detailed mobile device capability change information to the mobile device capability management device 14. This detailed information is set up by the profile change information generating unit in cooperation with a mobile device profile memory unit 18 and the mobile device profile monitoring unit 20.

Figure 6:
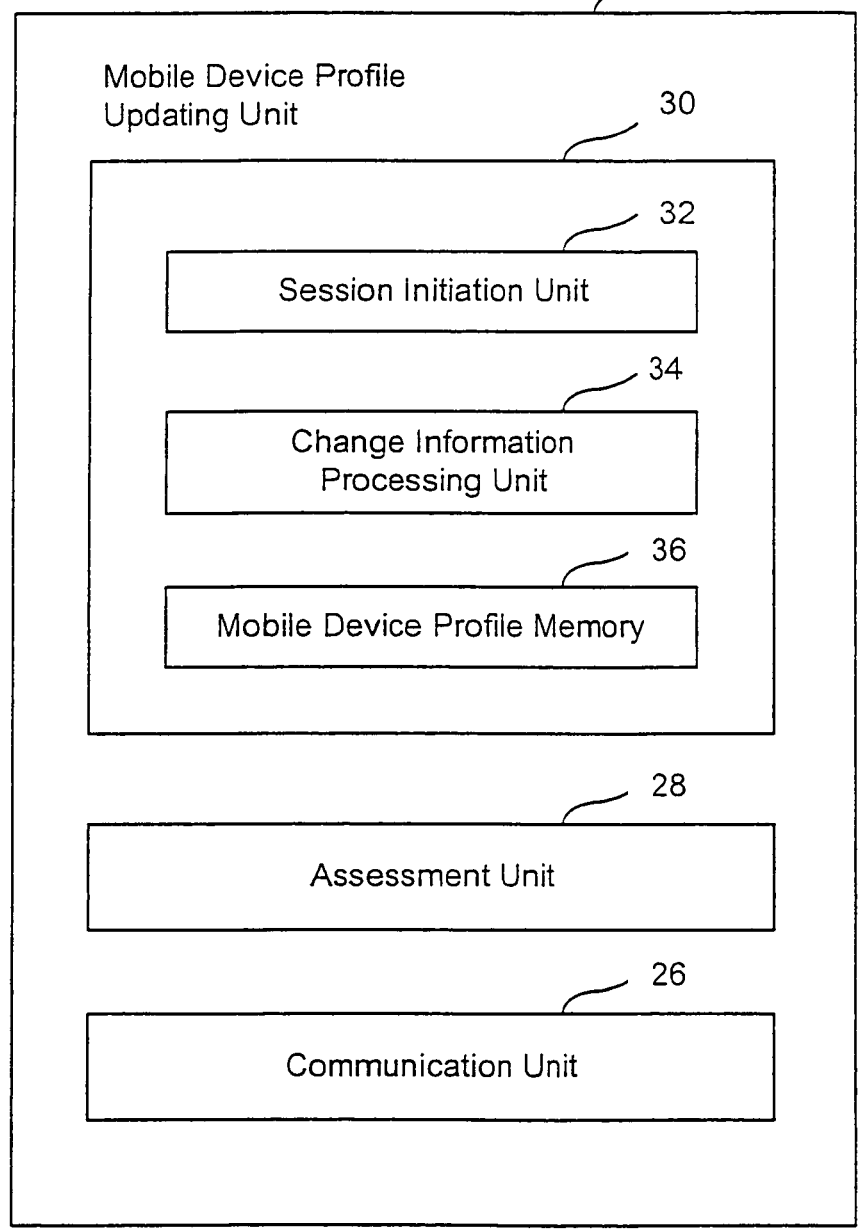
FIG. 6 shows a further detailed schematic diagram of the mobile device capability management device shown in FIG. 4.

FIG. 6 shows a further detailed schematic diagram of the mobile device capability management device 14 explained with respect to FIG. 4.

As shown in FIG. 6, the mobile device profile updating unit 30 shown in FIG. 4, according to the present invention, divides into a session initiation unit 32, a change information processing unit 34, and a mobile device profile memory 36.

Figure 7:
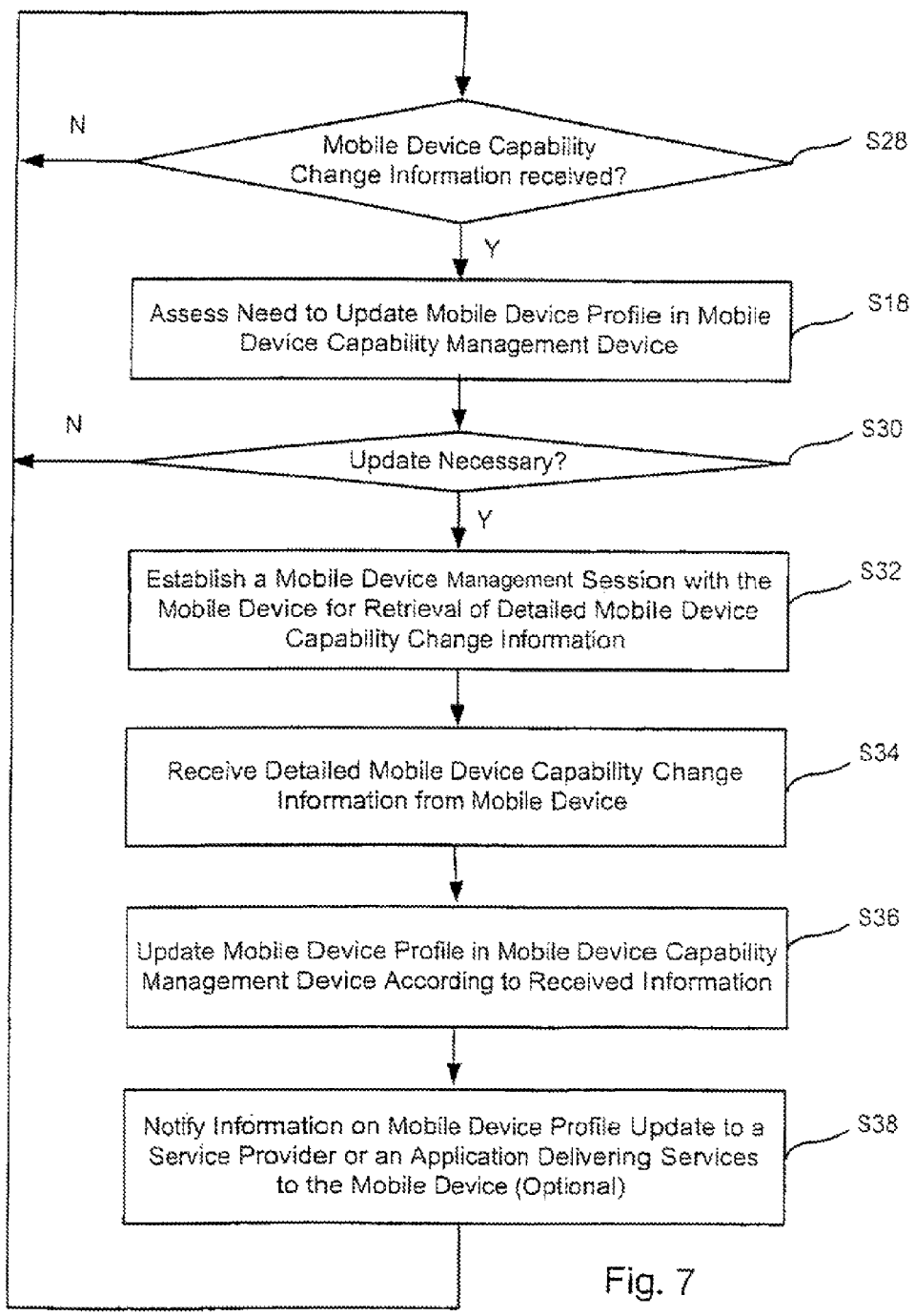
FIG. 7 shows a detailed flowchart of operation for the mobile device capability management device shown in FIG. 6.

FIG. 7 shows a further detailed flowchart of operation for the mobile device capability management 14 shown in FIG. 6.

As shown in FIG. 7, the communication unit 26 will execute a step S28 to monitor whether a mobile device capability change information, e.g., a change notification message CHAN, has been received at the mobile device capability management device 14. If so, the assessment unit 28 will execute the step S18 to assess the need to update a mobile device profile in the mobile device capability management device 14. In more detail, when the mobile device capability management device 14 is in receipt of a change notification message CHAN, the assessment unit 28 will retrieve the device mobile stored in the mobile device profile memory 36. Assessing the quantitative and qualitative indicators in the change notification message CHAN in relation to the retrieved device profile, the assessment unit 28 may assess the need to contact the mobile device 10 for related mobile device profile update, e.g., by modifying the management tree with respect to the mobile device 10.

E.g., in the assessment step S18, there is only a minor change to the mobile device capability. The mobile device capability management device 14 may decide to not contact the mobile device 10. However, should there be changes to critical objects in the management tree of the mobile device which touch operator policies or third party service providers, then the operator may choose to scan the mobile device 10 as soon as possible.

As shown in FIG. 7, heretofore the communication unit 26 will execute a step S32 to establish a mobile device management session with a mobile device 10 for retrieval of further detailed information on a mobile device capability change. The same communication unit 26 will execute a step S34 to receive detailed mobile device capability change information from the mobile device 10, e.g., according to a changes object CHOB. Should the mobile device capability management device 14 decide to contact the mobile device 10, it should then receive information on the CHOB object and the management tree itself in order to obtain necessary details about changes done to the management tree. In view of the above, it becomes clear that the approach according to the present invention may be basically divided into a marking phase, a notification phase, and a reaction phase. In particular, qualifiers used within the change notification CHAN message are used to prevent the mobile device capability management device from scanning the whole mobile device 10 for changes, each time the mobile device 10 is upgraded without involvement of the mobile device capability management device 14. Therefore, the present invention avoids time-consuming, unnecessary update procedures, disturbance of normal mobile device operation, generation of heavy traffic in the mobile communication network, and in particular with respect to mobile communication where cellular bandwidth is a very limited resource.

Then, the change information processing unit 34 will execute a step S36 to update the mobile device profile, e.g., a management tree, according to the received information and initiate a related update of the corresponding information in the mobile device profile memory 36. Optionally, the change information processing unit 34 may execute a step S38 to notify an information on a mobile device profile update to a service provider or in application delivery services.

In the following, further details handling mobile device capability changes will be explained with respect to FIGS. 8 and 9.

According to the present invention, for the setup of mobile device capability change information, it is suggested to compute a short description of the component and capability with respect to hardware and/or software that have changed since the left time related information was notified to the operator of a mobile device capability management device. The short description can then be communicated to the mobile device capability management device.

Figure 8:
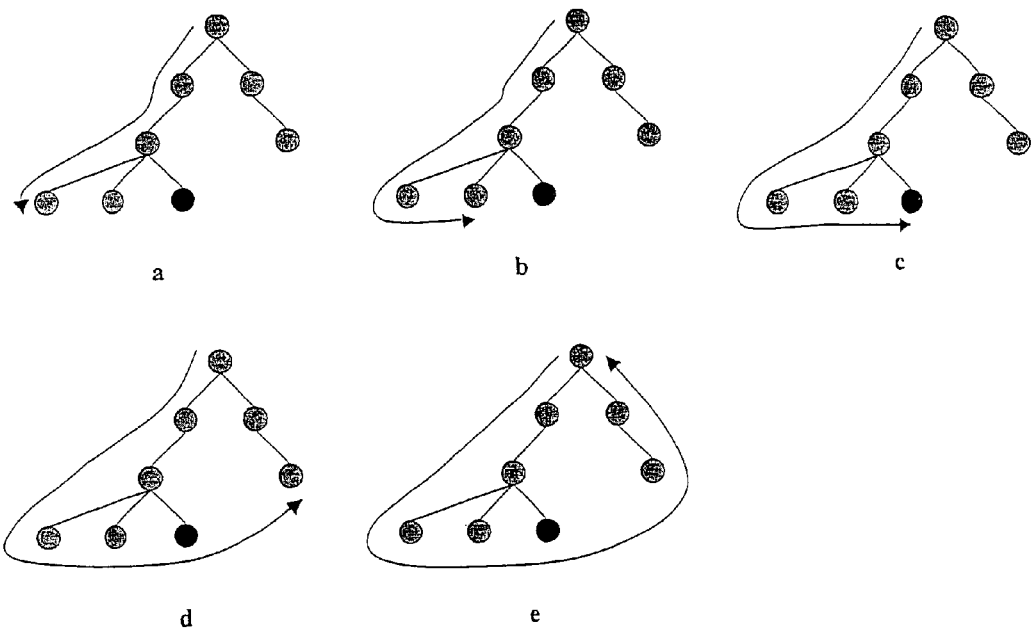
FIG. 8 shows an example of marking changed nodes in a mobile device management tree.

Heretofore, the present invention solves the problem to transfer mobile device capability change information with respect to a management tree shown in FIG. 8. The state of the management tree can change according to two ways: Nodes in the management tree can be added or removed and/or the content of a node in the management tree can change. The present invention handles both cases.

In the following, there will be described a method for retrieving changes of the contents of a leaf node in the management tree. Then will follow a method that allows to detect the deletion and insertion of nodes in the management tree. Heretofore, the following notation will used:

bit-string—a sequence of bits with most significant bit first
internal node—a node that is not a leaf
c[i] denotes bit number I of bit-string c
| denotes concatenation In the following, there will basically be described three phases. A first phase is provided to decide what mobile device capability change information needs to be conveyed to the mobile device capability management device, which phase will be referred to as mark-up of change nodes and computation of a code word. A second phase relates to the processing of information submitted by the mobile device 10 to the mobile device capability management device 14 and the related reaction thereto, which will be referred to as system side parsing in the following. A third phase, intermediate to the first phase and the second phase, is related to the way the mobile device capability change information is exchanged from the mobile device 10 to the mobile device capability management device 14.

In the following, the first phase, i.e. mark-up of changed nodes and computation of a code word, will be explained.

Heretofore, it is assumed that in the mobile device there is maintained a management tree having a management object CHOB inserted thereto. Here, the mobile device capability change information needs to convey the changes in the management object to the mobile device capability management device 14. One option is to code this information to a bit-string c referred to as code word in the following. To compute the code word, the profile change information generating unit 22 shown in FIG. 3 may follow different strategies, which will be explained in the following.

Firstly, the mobile device profile monitoring unit 20 shown in FIG. 3 needs to detect which changes have been made to the management object CHOB since the last time a code word c was sent to the mobile device capability management device 14, i.e. a difference between the management object CHOB at a current time and a mobile device capability systems view at the network side according to a previous time of mobile device capability management. One way of achieving this is to keep a copy or a representation of a previous management tree T' in the mobile device profile memory unit 18 shown in FIG. 3, which management tree T' was used to compute a last code word. Upon the time of computing a new code word, the mobile device profile monitoring unit 20 will compare the current management tree T with the stored representation of a previous management tree T' and mark the nodes that differ. Another approach would be that the mobile device profile monitoring unit 20 marks the nodes at the time of change, e.g., if a speech codec functionality is updated to a new version. Then, the corresponding node would be flagged as changed during the update process.

With respect to the first phase, following the mark-up of changed nodes if the profile change information generating unit 22 uses the representation of the management tree with marked change nodes and computes the code word c for transmission to the mobile device capability management device 14. The code word can be computed by the profile change information generating unit 22 in several ways, as will be explained in the following.

Heretofore, one may assume that there has been a change in the contents of one or more nodes in the management tree, but no addition or deletion of one or more nodes in the management tree. To compute the code word, the profile change information generating unit 22 initially lets the code word be an empty string and start at the root of the management tree T, which will then be traversed in the following manner:
1. If this node is an internal node, then go to step 2.
1a. If the content of this node has changed, then c=c|1.
1.b. If the content of this node has not changed, then c=c|0.
1c. End of recursion branch.
2. For each of the children of this node execute the procedure recursively.

It should be understood that if there is no specified order enforced on the children of one node in the management tree, then step 2 referred to above might be ambiguous. To avoid this, it is suggest to specify an order on the nodes of the management tree, e.g., a lexicographical order of the unified resource identifiers URI identifying each node. The code word c resulting from the execution of the given procedures hands bit-string $c[0]|c[1]|c[2]| \ldots |c[n-1]$, where n is the number of the leaves in the management tree, and $c[i]$ ($0<=i<n$) is equal to a value of 1 when the content of the node i has changed and 0 otherwise.

One example of the procedure outlined above is shown in FIG. 8. For this example, all shaded nodes are unchanged, but the black nodes have been marked as changed by the mark-up procedure. In part a of FIG. 8, the first leaf is encountered, it has not changed, so that the code word is set to 0. In part b of FIG. 8, the next code is encountered, it has not changed either, so a value of 0 is appended to the code word, yielding 00. In part c of FIG. 8, a node which is marked as changed is encountered, so that the code word is accordingly set to c=001. The recursion will then proceed to the right branch of the management tree and examine that the leaf node of this branch has not changed, part d and e of FIG. 8, so that at the end of the traversal the final code word is c=0010.

The second phase is then related to the code word set-up along the line explained above handled at the mobile communication network side. When the mobile device capability management device 14 receives the code word c from the mobile device 10, it will retrieve its current view of the management tree T' from the mobile device profile memory 36 shown in FIG. 6. Here, the change information processing unit 34 will first set a counter i to 1 traverse the management tree T' in the same order which was followed by the mobile device 10, as explained with respect to FIG. 8. Each time the change information processing unit 34 visits a leaf node of the management tree T', it looks at the corresponding value $c[i]$ of the code word. If the related value is equal to 1, the change information processing unit 34 marks the corresponding node as changed and increases the counter i by 1 and proceeds with the traversal. If the related value $c[i]$ is equal to 0, a counter is increased by 1 and the traversal is continued. When the change information processing unit 34 has executed the traversal of the tree and has looked at all bits of the code word, the change information processing unit may then trigger a command to read the corresponding nodes marked as changed from the management tree maintained at the mobile device 10.

In the following, further modifications of the first and second phase, i.e. marking of changed nodes at the mobile device 10 and computation of a code word, followed by system side parsing will be explained. Instead of sending the code word c to the mobile device capability management device 14, the mobile device 10 may choose to send a hash of the code word c to keep the mobile device capability change message short and/or of fixed length. Then, the mobile device capability management device 14 would keep a pre-computed list of hashes in the mobile device profile memory 36, and further a one-to-one mapping between which nodes have changed and the set of hashes that would correspond thereto. Here, the hash value should be shorter than the code word, which might give raise to collisions, i.e. if there are several possible node-change configurations corresponding to a single hash value. However, there might be several of the configurations that are not possible, e.g., some nodes may not be changed in the management tree or only be changed by the operator of the mobile communication network, so that this problem may be easily overcome. Optionally, for long code words one may also apply a compression scheme to reduce amount of traffic in the mobile communication network.

While above it has been explained that the code word c contains one bit per leaf in the management tree, it may also be possible to reduce the length of the code word by skipping bits of those nodes that are known to have a static content. E.g., on most mobile devices it may not be possible to upgrade the screen, and in that case, the screen size of pixels could be skipped as an example. The pre-requisite is that both the mobile device 10 and the operator of the mobile communication network take the same viewpoint that the nodes are static.

Further, while above only tree traversal algorithms have been given as example, in the most general manner it is important that the management data structure is traversed in the same order by the mobile device 10 and the mobile device capability management device 14.

In the following, with respect to FIG. 9, there will be given another example for generation of mobile device capability change information with respect to the detection of additional deletion of nodes. Heretofore, a slightly different code c can be constructed.

Figure 9:
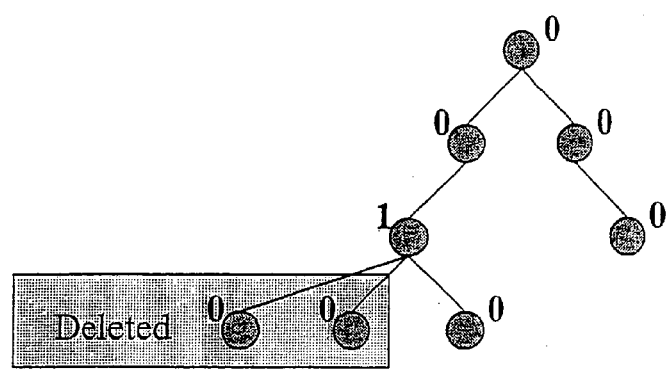
FIG. 9 shows a further example of marking changed nodes in a mobile device capability management tree.

As shown in FIG. 9, instead of only assigning a bit to each leaf node of the management tree, the profile change information generating unit 22 now assigns a bit to each node in the management tree. The value of the bit is assigned as follows: If the node has no new children or does not have any children removed, the value of the bit associated with the node is 0, otherwise it is 1. The assignment of the bits is performed during a marking process as described above.

Heretofore, the mobile device profile monitoring unit 20 traverses the management tree using, e.g., a breadth first search, and output the bit assigned to each node when the node is visited. Also, mobile change information generating unit 22 must not traverse any new sub-trees, but only mark the parent new sub-trees with a value of 1.

FIG. 9 shows an example of the approach so far. Here, the code word computed using a breadth first search for the management tree would lead to a code word c=00010000. The order of the nodes using the breadth first search is generated by the profile change information generating unit 22 reading the nodes in the management trees top-down, left-to-right.

Then, when the mobile device capability management device 14 receives the code word, it will be scanned by the exchange information processing unit 34 from left to right, following the management tree, as shown in FIG. 9. Here, the change information processing unit 34 should use the same tree traversal algorithm as it was used by the profile change information generating unit 22 in the mobile device. If the change information processing unit 34 processes a node of which the corresponding bit in the code word is 1, this will be marked for further investigation. Once the change information processing unit 34 has executed the scanning of the code word c, it then issues a command to the mobile device 10 for traversal of the marked nodes and pick-up of any changes that have occurred to the related children nodes. While it would of course be possible to read from the mobile device 10 during a scan, it is important to not include the newly found or to remove the deleted nodes from the management tree before the scan is complete.

The advantage of the approach explained above is that it is not necessary to read all nodes of the management tree in the mobile device 10 for upgrade of a management tree in the mobile device capability management device 14. Only subtrees that are new or have been deleted need to be visited.

In the following, the third phase being related to exchange of mobile capability change information between the mobile device and the mobile device capability management device 14 will be explained with respect to FIG. 10.

Figure 10:
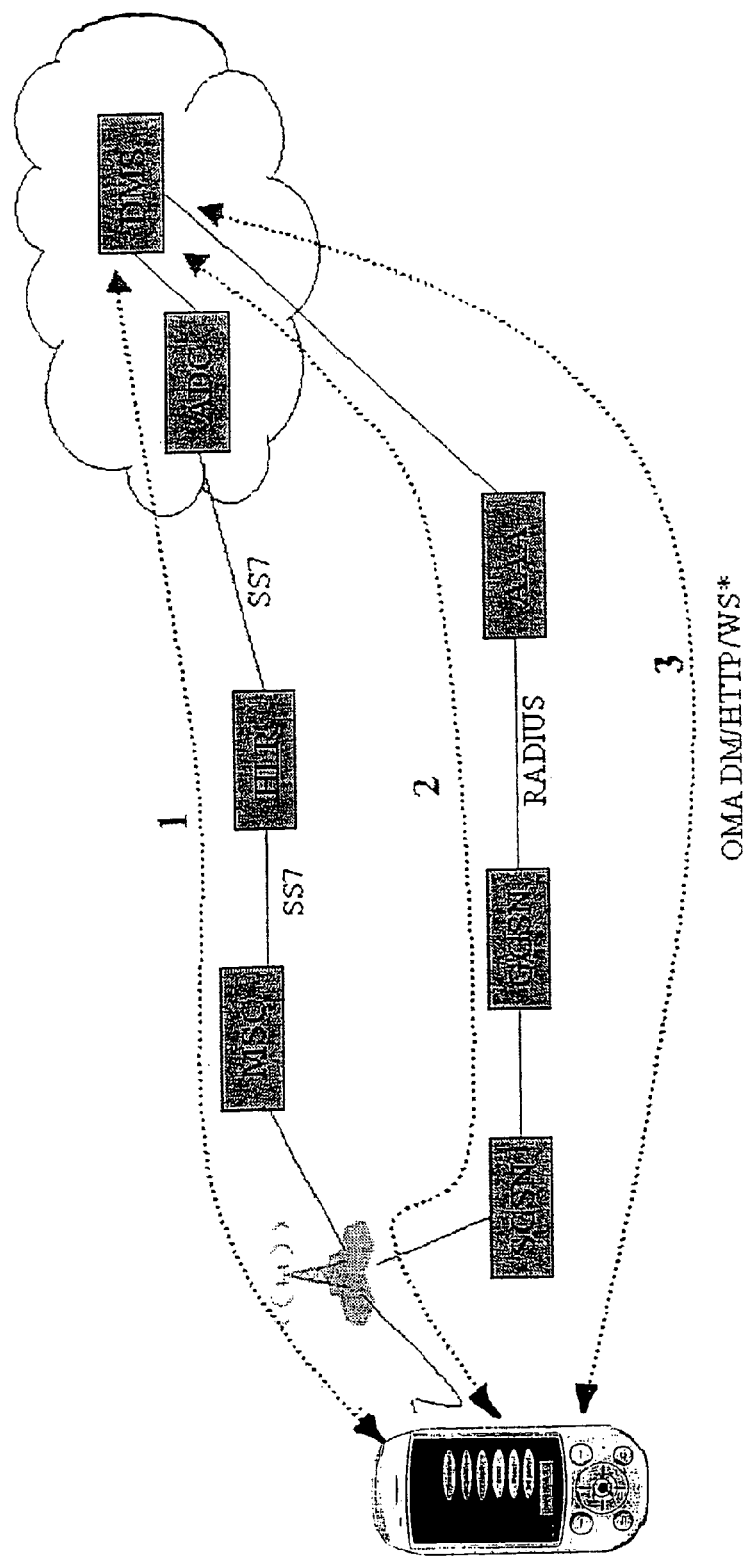
FIG. 10 shows examples of paths for conveying mobile device capability change information between the mobile device and the mobile device capability management device.

As shown in FIG. 10, the mobile device capability change information and/or related change message CHAN can be communicated using traditional cellular signaling SS7, such as automatic device detection MSC-Home Location Register HLR-Device Management Server. Depending on the bandwidth available the granularity of the mobile device profile change information may be adapted.

As shown in FIG. 10, it is also possible to convey such mobile device capability information upon GPRS attachment using a RADIUS, 'Remote Authentication Dial In User Service', RFC2138, IETF, April 1997/DIAMETER, 'Diameter Base Protocol', RFC3588, IRTF, September 2003 message as an attribute value from the basic GPRS support node GGSN to the AAA unit and then further to the device management GMS. Further, the mobile device can convey the mobile device capability change information via the service layer, e.g., upon start of an open mobile alliance device management session according to MTREE, OMA, SyncML Device Management Tree and Description, version 1.1, February 2002.

While with respect to FIG. 10 the application of a cellular network signaling of a GPRS/PS network and/or the service layer has been described, these processes are to be considered as examples only, and any other suitable approach to information exchange may be applied within the framework of the present invention.

The invention claimed is:

1. Method of operating a mobile device capability management device in a mobile communication network with respect to at least one mobile device served by the mobile communication network, wherein a mobile device capability is represented as a first mobile device profile in the mobile device capability management device and as a second mobile device profile in the mobile device, the method implemented by the mobile device capability management device comprising the steps:
  receiving, at the mobile device capability management device, a mobile device capability change information (CHAN) with respect to a capability change of the mobile device, wherein the mobile device capability change information (CHAN) contains a qualitative parameter indicating a degree of change to a management tree of the second mobile device profile and a quantitative parameter indicating amount of effective changes to the management tree of the second mobile device profile; and
  assessing, at the mobile device capability management device, the need to update the first mobile device profile on the basis of a mobile device capability management policy and the received mobile device capability change information.

2. Method according to claim 1, further comprising a step of updating, at the mobile device capability management device, the first mobile device profile according to the mobile device capability management policy and the mobile device capability change information.

3. Method according to claim 2, where the step of updating the first mobile device profile further comprises the steps:
  establishing, by the mobile device capability management device, a mobile device management session between the mobile device capability management device and the mobile device for evaluation of the management tree of the second mobile device profile with respect to a mobile device capability change; and
  receiving, at the mobile device capability management device, the mobile device capability update information from the mobile device in accordance with an evaluation result.

4. Method according to one of the claim 1, where;
  the first mobile device profile is represented as a mobile device management tree structure comprising mobile device management objects; and
  the management tree of the second mobile device profile comprising mobile device management objects.

5. Method according to claim 4, where the step of updating the first mobile device profile in the mobile device capability management device further comprises a step of updating, by the mobile device capability management device, a mobile device capability change object (CHOB), wherein the mobile device capability change object is a mobile device management object in the mobile device management tree structure dedicated to mobile device capability change management.

6. Method according to claim 1, where the step of assessing, by the mobile device capability management device, the need to update the management tree of the first mobile device profile is achieved through classification of the quantitative parameter and/or the qualitative parameter.

7. Method according to claim 1, further comprising a step of notifying, by the mobile device capability management device, a service provider providing at least one service to at least one of the mobile device and an application interacting with the mobile device on a mobile device capability change.

8. Method according to claim 1, where the mobile device capability change information is received directly from the mobile device at the mobile device capability management device.

9. Method according to claim 1, where the mobile device capability change information is received by the mobile device capability management device from a mobile device capability monitoring device.

10. Method according to claim 1, where the mobile device capability change information is exchanged through at least one of a circuit switched mobile communication, packet switched mobile communication, and a service layer data exchange.

11. The method of claim 1, where software code portions corresponding to the steps comprise a computer program product directly loadable into the internal memory of the mobile device capability management device operated in a mobile communication network, wherein the computer program product is run on a processor of the mobile device capability management device.

12. The method of claim 1, where the assessing step further comprises:
  updating the first mobile device profile if there is a positive assessment on necessity of need to update the first mobile device profile; and
  not updating the first mobile device profile if there is a negative assessment on necessity of need to update the first mobile device profile.

13. Method according to claim 1, wherein the degree of change is indicated as major, medium, or minor.

14. Method according to claim 1, wherein the degree of change is indicated on a scale from 0 to 1.

15. Method according to claim 1, wherein the degree of change is coded in a code word.

16. Method of operating a mobile device being enabled for mobile device capability management through a mobile communication network, the method implemented by the mobile device comprising the steps:
  monitoring, at the mobile device, a change in a mobile device capability, wherein the mobile device capability state is represented as a mobile device profile;
  generating, at the mobile device, mobile device capability change information with respect to a mobile device capability change, where the mobile device capability change information comprises a qualitative parameter indicating a degree of change to the mobile device profile and a quantitative parameter indicating amount of effective changes to the mobile device profile; and
  forwarding, by the mobile device, the mobile device capability change information to a mobile device capability management device or a mobile device capability monitoring device through the mobile communication network.

17. Method according to claim 16, further comprising the steps of:
  receiving, at the mobile device, a request for detailed mobile device capability change information from the mobile communication network;
  establishing, by the mobile device, a mobile device management session with the mobile communication network; and
  forwarding, by the mobile device, the detailed mobile device capability change information to the mobile communication network.

18. Method according to claim 16, further comprising a step of representing, at the mobile device, the mobile device profile as a mobile device management tree structure comprising at least one mobile device management object.

19. Method according to claim 18, further comprising a step of representing, at the mobile device, the mobile device capability change information as a mobile device capability change object (CHOB) in the mobile device management tree, wherein the mobile device capability change object (CHOB) is a mobile device management object in the mobile device management tree structure dedicated to mobile device capability change management.

20. Method according to claim 16, where the mobile device capability change information is forwarded by the mobile device to the mobile device capability management device in the mobile communication network.

21. Method according to claim 16, where the mobile device capability change information is forwarded by the mobile device to the mobile device capability monitoring device in the mobile communication network, for subsequent conveyance thereof to the mobile device capability management device in the mobile communication network.

22. Method according to claim 16, where the mobile device capability change information is exchanged with the mobile communication network through at least one of a circuit switched mobile communication, a packet switched mobile communication, and a service layer data exchange.

23. The method of claim 16, where software code portions corresponding to the steps comprise a computer program product directly loadable into the internal memory of the mobile device being enabled for mobile device capability management through a mobile communication network, wherein the computer program product is run on a processor of the mobile device.

24. Method according to claim 16, wherein the degree of change is indicated as major, medium, or minor.

25. Method according to claim 16, wherein the degree of change is indicated on a scale from 0 to 1.

26. Method according to claim 16, wherein the degree of change is coded in a code word.

27. Mobile device capability management device being operated in a mobile communication network with respect to at least one mobile device served by the mobile communication network, wherein a mobile device capability is represented as a first mobile device profile in the mobile device capability management device and as a second mobile device profile in the mobile device, the mobile device capability management device comprising:
  a communication unit adapted to receive mobile device capability change information with respect to a capability change of the mobile device;
  an assessment unit adapted to process the mobile device capability change information which contains a qualitative parameter indicating a degree of change to a management tree of the second mobile device profile and a quantitative parameter indicating amount of effective changes to the management tree of the second mobile device profile; and
  the assessment unit is further adapted to assess the need to update the first mobile device profile on the basis of a mobile device capability management policy and the mobile device capability change information.

28. Mobile device capability management device according to claim 27, further comprising a mobile device profile updating unit adapted to update the first mobile device profile according to the mobile device capability management policy and the received mobile device capability change information.

29. Mobile device capability management device according to claim 28, where the mobile device profile updating unit comprises:
  a session initiating unit adapted to initiate a mobile device management session between the mobile device capability management device and the mobile device for evaluation of the management tree of the second mobile device profile with respect to a mobile device capability change; and a capability change information processing unit adapted to process the mobile device capability change information from the mobile device in accordance with an evaluation result.

30. Mobile device capability management device according to claim 27, further comprising a mobile device profile memory adapted to store a mobile device management tree structure of the first mobile device profile and the management tree of the second mobile device profile, wherein each management tree comprising mobile device management objects.

31. Mobile device capability management device according to claim 30, where the capability change information processing unit is adapted to update the first mobile device profile in the mobile device profile memory by updating a mobile device capability change object, wherein the mobile device capability change object (CHOB) is a mobile device management object in the mobile device management tree structure dedicated to mobile device capability change management.

32. Mobile device capability management device according to claim 27, where the assessment unit is adapted to assess the need to update the management tree of the first mobile device profile through classification of the quantitative parameter and/or the qualitative parameter.

33. Mobile device capability management device according to claim 27, where the mobile device profile updating unit is adapted to notify a service provider providing at least one service to at least one of the mobile device and an application interacting with the mobile device on a mobile device capability change.

34. Mobile device capability management device according to claim 27, where the communication unit is adapted to receive the mobile device capability change information directly from the mobile device.

35. Mobile device capability management device according to claim 27, where the communication unit is adapted to receive the mobile device capability change information from a mobile device capability monitoring device.

36. Mobile device capability management device according to claim 27, where the communication unit is adapted to receive the mobile device capability change information through circuit switched mobile communication, packet switched mobile communication, and/or through service layer data exchange.

37. The mobile device capability management device of claim 27, where the assessment unit is configured to:
update the first mobile device profile if there is a positive assessment on necessity of need to update the first mobile device profile; and
not update the first mobile device profile if there is a negative assessment on necessity of need to update the first mobile device profile.

38. Mobile device capability management device according to claim 27, wherein the degree of change is indicated as major, medium, or minor.

39. Mobile device capability management device according to claim 27, wherein the degree of change is indicated on a scale from 0 to 1.

40. Mobile device capability management device according to claim 27, wherein the degree of change is coded in a code word.

41. Mobile device being enabled for mobile device capability management through a mobile communication network, wherein a mobile device capability state is represented in the mobile device as a mobile device profile, the mobile device comprising:

a mobile device profile monitoring unit adapted to monitor a change in the mobile device capability;
a profile change information generating unit adapted to generate mobile device capability change information with respect to a mobile device capability change;
the profile change information generating unit is further adapted to generate the mobile device capability change information with a qualitative parameter indicating a degree of change to the mobile device profile and a quantitative parameter indicating amount of effective changes to the mobile device profile; and
a communication unit adapted to forward the mobile device capability change information to a mobile device capability management device or a mobile device capability monitoring device through the mobile communication network, where the mobile device upon change of the mobile device capability sends the mobile device capability change information.

42. Mobile device according to claim 41, where the communication unit is adapted to:
receive a request for update of a remote mobile device profile being maintained in the mobile communication network;
establish a mobile device management session with the mobile communication network; and
to forward detailed mobile device capability change information to the mobile communication network.

43. Mobile device according to claim 41, further comprising a mobile device profile memory unit adapted to store the mobile device profile as a mobile device management tree structure comprising at least one mobile device management object.

44. Mobile device according to claim 43, where the profile change information generating unit is adapted to generate mobile device capability change information as a mobile device capability change object in the mobile device management tree, wherein the mobile device capability change object is a mobile device management object in the mobile device management tree structure dedicated to mobile device capability change management.

45. Mobile device according to claim 41, where the communication unit is adapted to forward the mobile device capability change information to the mobile device capability management device in the mobile communication network.

46. Mobile device according to claim 41, where the communication unit is adapted to forward the mobile device capability change information to the mobile device capability monitoring device in the mobile communication network, for subsequent conveyance thereof to the mobile device capability management device in the mobile communication network.

47. Mobile device according to claim 41, where the communication unit is adapted to exchange mobile device capability change information with the mobile communication network through at least one of a circuit switched mobile communication, a packet switched mobile communication, and a service layer data exchange.

48. Mobile device according to claim 41, wherein the degree of change is indicated as major, medium, or minor.

49. Mobile device according to claim 41, wherein the degree of change is indicated on a scale from 0 to 1.

50. Mobile device according to claim 41, wherein the degree of change is coded in a code word.

* * * * *

UNITED STATES PATENT AND TRADEMARK OFFICE
CERTIFICATE OF CORRECTION

| | |
|---|---|
| PATENT NO. | : 8,874,091 B2 |
| APPLICATION NO. | : 11/997658 |
| DATED | : October 28, 2014 |
| INVENTOR(S) | : Norrman |

It is certified that error appears in the above-identified patent and that said Letters Patent is hereby corrected as shown below:

On the Title Page, in item (75), under "Inventors", in Column 1, Line 2, insert -- Joacim Halén, Sollentuna (SE); Luis Barriga, Bandhagen (SE); --.

On Page 2, in item (56), under "OTHER PUBLICATIONS", in Column 1, Line 1, delete "et al:" and insert -- et al.: --, therefor.

On Page 2, in item (56), under "OTHER PUBLICATIONS", in Column 2, Line 1, delete "et al:" and insert -- et al.: --, therefor.

In the Drawings

In Fig. 2, Sheet 2 of 8, delete "Mangement" and insert -- Management --, therefor.

In Fig. 3, Sheet 3 of 8, in step "S12", Line 1, delete "Capabilty" and insert -- Capability --, therefor.

In the Specification

In Column 5, Line 30, delete "DRAWING" and insert -- DRAWINGS --, therefor.

In Column 5, Line 61, delete "DESCRIPTION" and insert -- DETAILED DESCRIPTION --, therefor.

In Column 10, Line 31, delete "concatenation" and insert -- concatenation. --, therefor.

Signed and Sealed this
Twenty-fifth Day of August, 2015

Michelle K. Lee
*Director of the United States Patent and Trademark Office*

In the Claims

In Column 14, Line 19, in Claim 2, delete "Method according to" and insert -- The method of --, therefor.

In Column 14, Line 24, in Claim 3, delete "Method according to" and insert -- The method of --, therefor.

In Column 14, Line 36, in Claim 4, delete "Method according to one of the claim 1, where;" and insert -- The method of claim 1, where: --, therefor.

In Column 14, Line 42, in Claim 5, delete "Method according to" and insert -- The method of --, therefor.

In Column 14, Line 50, in Claim 6, delete "Method according to" and insert -- The method of --, therefor.

In Column 14, Line 55, in Claim 7, delete "Method according to" and insert -- The method of --, therefor.

In Column 14, Line 60, in Claim 8, delete "Method according to" and insert -- The method of --, therefor.

In Column 14, Line 64, in Claim 9, delete "Method according to" and insert -- The method of --, therefor.

In Column 15, Line 1, in Claim 10, delete "Method according to" and insert -- The method of --, therefor.

In Column 15, Line 22, in Claim 13, delete "Method according to" and insert -- The method of --, therefor.

In Column 15, Line 24, in Claim 14, delete "Method according to" and insert -- The method of --, therefor.

In Column 15, Line 26, in Claim 15, delete "Method according to" and insert -- The method of --, therefor.

In Column 15, Line 47, in Claim 17, delete "Method according to" and insert -- The method of --, therefor.

In Column 15, Line 58, in Claim 18, delete "Method according to" and insert -- The method of --, therefor.

In Column 15, Line 62, in Claim 19, delete "Method according to" and insert -- The method of --, therefor.

In Column 16, Line 3, in Claim 20, delete "Method according to" and insert -- The method of --, therefor.

In Column 16, Line 7, in Claim 21, delete "Method according to" and insert -- The method of --, therefor.

In Column 16, Line 13, in Claim 22, delete "Method according to" and insert -- The method of --, therefor.

In Column 16, Line 25, in Claim 24, delete "Method according to" and insert -- The method of --, therefor.

In Column 16, Line 27, in Claim 25, delete "Method according to" and insert -- The method of --, therefor.

In Column 16, Line 29, in Claim 26, delete "Method according to" and insert -- The method of --, therefor.

In Column 16, Lines 53-54, in Claim 28, delete "Mobile device capability management device according to" and
insert -- The mobile device capability management device of --, therefor.

In Column 16, Lines 59-60, in Claim 29, delete "Mobile device capability management device according to" and
insert -- The mobile device capability management device of --, therefor.

In Column 17, Lines 5-6, in Claim 30,
delete "Mobile device capability management device according to" and
insert -- The mobile device capability management device of --, therefor.

In Column 17, Lines 12-13, in Claim 31,
delete "Mobile device capability management device according to" and
insert -- The mobile device capability management device of --, therefor.

In Column 17, Lines 21-22, in Claim 32,
delete "Mobile device capability management device according to" and
insert -- The mobile device capability management device of --, therefor.

In Column 17, Lines 26-27, in Claim 33,
delete "Mobile device capability management device according to" and
insert -- The mobile device capability management device of --, therefor.

In Column 17, Lines 32-33, in Claim 34,
delete "Mobile device capability management device according to" and
insert -- The mobile device capability management device of --, therefor.

In Column 17, Lines 36-37, in Claim 35,
delete "Mobile device capability management device according to" and
insert -- The mobile device capability management device of --, therefor.

In Column 17, Lines 40-41, in Claim 36,
delete "Mobile device capability management device according to" and
insert -- The mobile device capability management device of --, therefor.

In Column 17, Lines 54-55, in Claim 38,
delete "Mobile device capability management device according to" and
insert -- The mobile device capability management device of --, therefor.

In Column 17, Lines 57-58, in Claim 39,
delete "Mobile device capability management device according to" and
insert -- The mobile device capability management device of --, therefor.

In Column 17, Lines 60-61, in Claim 40,
delete "Mobile device capability management device according to" and
insert -- The mobile device capability management device of --, therefor.

In Column 18, Line 20, in Claim 42, delete "Mobile device according to" and
insert -- The mobile device of --, therefor.

In Column 18, Line 29, in Claim 43, delete "Mobile device according to" and
insert -- The mobile device of --, therefor.

In Column 18, Line 35, in Claim 44, delete "Mobile device according to" and
insert -- The mobile device of --, therefor.

In Column 18, Line 43, in Claim 45, delete "Mobile device according to" and
insert -- The mobile device of --, therefor.

In Column 18, Line 47, in Claim 46, delete "Mobile device according to" and
insert -- The mobile device of --, therefor.

In Column 18, Line 54, in Claim 47, delete "Mobile device according to" and
insert -- The mobile device of --, therefor.

In Column 18, Line 60, in Claim 48, delete "Mobile device according to" and
insert -- The mobile device of --, therefor.

CERTIFICATE OF CORRECTION (continued)
U.S. Pat. No. 8,874,091 B2

In Column 18, Line 62, in Claim 49, delete "Mobile device according to" and insert -- The mobile device of --, therefor.

In Column 18, Line 64, in Claim 50, delete "Mobile device according to" and insert -- The mobile device of --, therefor.